US012095204B1

(12) United States Patent
Michelson

(10) Patent No.: US 12,095,204 B1
(45) Date of Patent: Sep. 17, 2024

(54) POWER PLUG

(71) Applicant: Jared E. Michelson, Arlington, VA (US)

(72) Inventor: Jared E. Michelson, Arlington, VA (US)

(73) Assignee: Jared E. Michelson, Arlington, VA (US)

( * ) Notice: Subject to any disclaimer, the term of this patent is extended or adjusted under 35 U.S.C. 154(b) by 0 days.

(21) Appl. No.: 18/403,089

(22) Filed: Jan. 3, 2024

(51) Int. Cl.
*H01R 11/22* (2006.01)
*H01R 13/639* (2006.01)
*H01R 24/28* (2011.01)
*H01R 103/00* (2006.01)

(52) U.S. Cl.
CPC ......... *H01R 13/6395* (2013.01); *H01R 24/28* (2013.01); *H01R 2103/00* (2013.01)

(58) Field of Classification Search
CPC ............................ H01R 13/6395; H01R 24/28
See application file for complete search history.

(56) References Cited

U.S. PATENT DOCUMENTS 881,371 A * 3/1908 Brown
1,119,864 A * 12/1914 Uvington ............. H01R 13/193 439/269.2
1,957,773 A * 5/1934 Good ................... H01R 13/193 439/269.2
1,976,501 A 10/1934 James
2,484,525 A * 10/1949 Norris .................. H01R 13/193 439/459
2,493,457 A * 1/1950 Kenure .................. H01R 13/20 439/269.2
2,775,744 A * 12/1956 Henneman ........... H01R 13/193 439/269.2
3,013,242 A * 12/1961 Terlinde ............... H01R 13/193 439/269.2
3,204,213 A * 8/1965 Bauer .................... H01R 27/00 439/825
4,136,919 A 1/1979 Howard et al.
4,566,187 A 1/1986 Chen
5,145,393 A * 9/1992 Schoon ................ H01R 13/443 439/269.2
7,588,451 B2 * 9/2009 Chen .................... H01R 13/701 439/269.2
8,287,298 B2 10/2012 Hsu et al.
8,840,418 B2 9/2014 Chien

* cited by examiner

*Primary Examiner* — Neil Abrams
(74) *Attorney, Agent, or Firm* — Leech Tishman Fuscaldo & Lampl, LLC

(57) ABSTRACT

A plug includes a body having a longitudinal axis, a prong extending outward from the body parallel to the longitudinal axis, and a biasing element within the body applying lateral pressure to the prong. A second prong can be provided that extends outward from the body parallel to the first prong, and the biasing element can apply lateral pressure to the second prong. The first prong can be biased toward or away from the second prong, and both can be biased in opposite directions. The biasing element can include a spring, and the spring can be disposed between the first prong and the second prong. Also, the biasing element can cause the prong to angle toward or away from the longitudinal axis. A locking mechanism can be provided to move or inhibit movement of the first prong and the second prong.

18 Claims, 3 Drawing Sheets

POWER PLUG

CROSS-REFERENCE TO RELATED APPLICATION n/a.

FIELD

The present technology is generally related to electrical plugs.

BACKGROUND

Electrical plugs and outlets are very mature technologies that have only incrementally changed since their original development in the 1880's. Most of North America and Central America, and some of South America, use connectors standardized by the National Electrical Manufacturers Association (NEMA). The familiar outlets or wall sockets have two parallel, rectangular slots within which are metal, electrical contacts. The plug includes two parallel, rectangular metal blades that are spaced apart the same distance as the slots in the outlet and are smaller than the slots in the outlet so that they can be introduced into the slots in the outlet. When introduced, the blades touch the contacts of the outlet to place the blades and the contacts in electrical communication.

For more than 100 years, the plug was relatively small and lightweight and unless weighted or pulled downward by a cord attached to the plug, the plug generally stayed in place in connection with the socket without any attachment or locking mechanism other than a slight friction-fit of the blades within the socket. However, over time with repeated plugging and unplugging the friction fit diminishes and the blades can become loose in the socket. When this happens, the electrical communication between one or both blades and the socket can be lost and the plug can even totally or partially disengage from the socket.

In recent years some plugs have become, much, much heavier as they include various electrical power adapters and converters. As a result, they often disengage from the socket very easily. With older plugs having blades made of copper, people would often gently bend the blades outward and jam them back into the socket to increase the friction fit in the hope of establishing electrical communication. This often worked, at least for a while, but it wasn't a satisfactory long-term solution even when it did work. Current prongs are made of less malleable alloys and are mounted in hard plastic. Thus, they don't bend easily if at all, and if too much pressure is applied in an attempt to bend them, the prongs or the plug break. Further, the adapter cords are typically fairly short and are routinely moved and pulled. Thus, the plugs, especially those with adapters, disengage from sockets frequently.

SUMMARY

The present invention overcomes the longstanding and unmet need for enhancing electrical connection of a plug to a socket. The invention includes a plug having electrical contact prongs that are biased laterally inward or outward (toward or away from each other to increase or decrease the space between them) to ensure a snug fit into a wall outlet to ensure that good electrical contact is made by the prongs and the electrical contacts withing the outlet, and so that the plug (like a heavy charging adapter) does not fall out of the wall outlet.

In an exemplary embodiment, a plug includes a body having a longitudinal axis, a prong extending outward from the body parallel to the longitudinal axis, and a biasing element within the body applying lateral pressure to the prong. A second prong can be provided that extends outward from the body parallel to the first prong, and the biasing element can apply lateral pressure to the second prong.

The first prong can be biased toward or away from the second prong, and both can be biased in opposite directions. The biasing element can include a spring, and the spring can be disposed between the first prong and the second prong. Also, the biasing element can cause the prong to angle toward or away from the longitudinal axis.

A locking mechanism can be provided to move or inhibit movement of the first prong and the second prong and an alignment element can be disposed within the body perpendicular to the longitudinal axis, wherein the first prong and the second prong define an aperture through which the alignment element is disposed, wherein the first prong and the second prong translate laterally along the alignment element while maintaining a parallel orientation with respect to each other.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
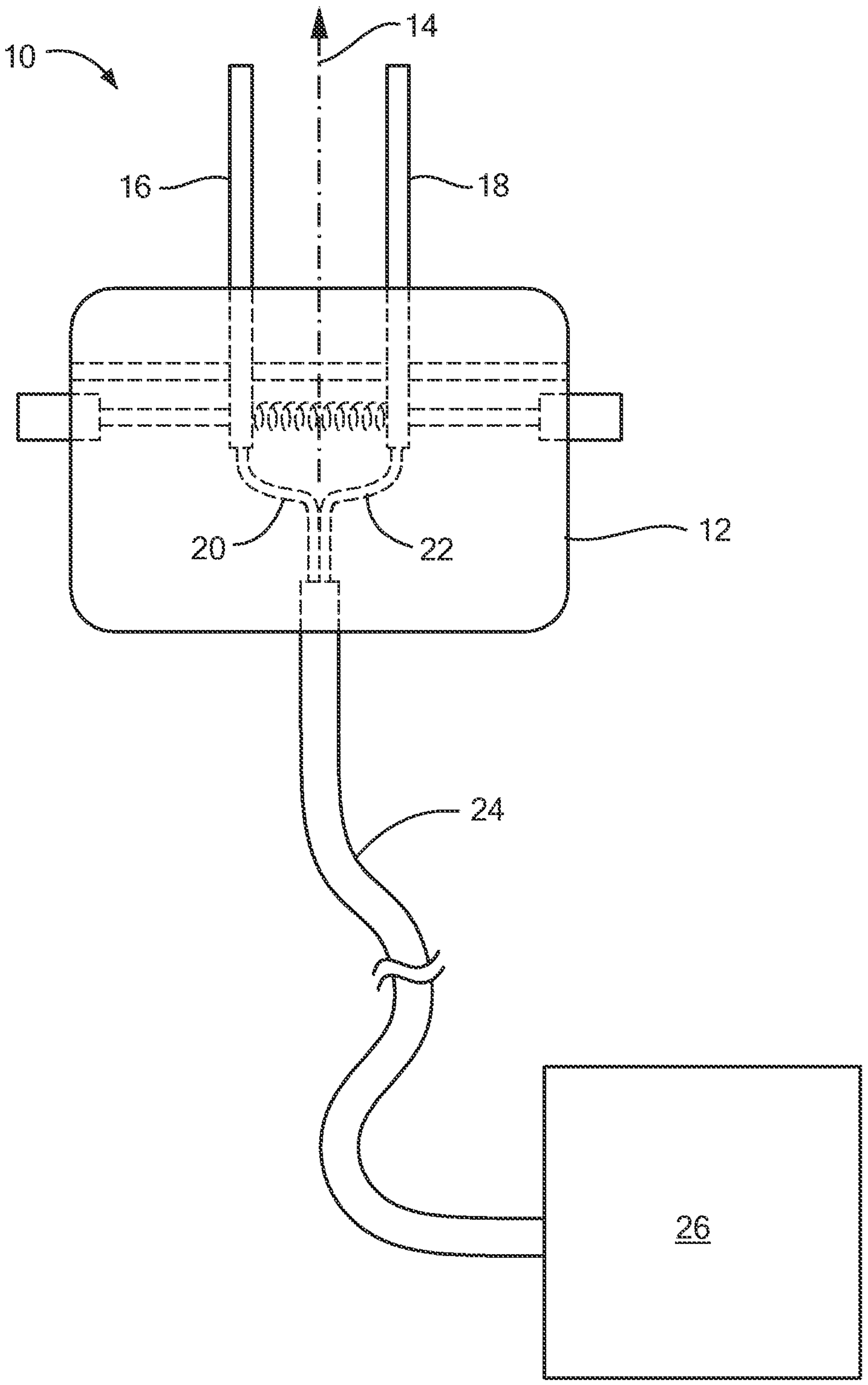
FIG. 1 illustrates a plug that is in accordance with the invention.

Referring now to FIG. 1, a plug 10 includes a plug block or body 12 having a longitudinal axis 14. A first prong 16 extends outward from the plug block or body 12 parallel to the longitudinal axis 14. A second prong 18 extends outward from the plug block or body 12 parallel to the longitudinal axis 14 and the first prong 16. Electrical wires 20 and 22 are connected to the first prong 16 and second prong 18, respectively. The electrical wires 20 and 22 exit the plug block or body 12 as a single cord 24 that leads to an electrical device 26. The termination of the cord 24 is not a consideration of the invention. As described in more detail below, one or both prongs are movable laterally within the plug block or body 12 a very small amount, such as less than 2 mm, while the prongs maintain parallel orientation to the longitudinal axis. Although the plug block or body 12 appears solid from the exterior, it can be hollow in whole or in part to provide space for the other components described below and/or so that one or both prongs 16, 18 can move laterally within the plug block or body.

Figure 2:
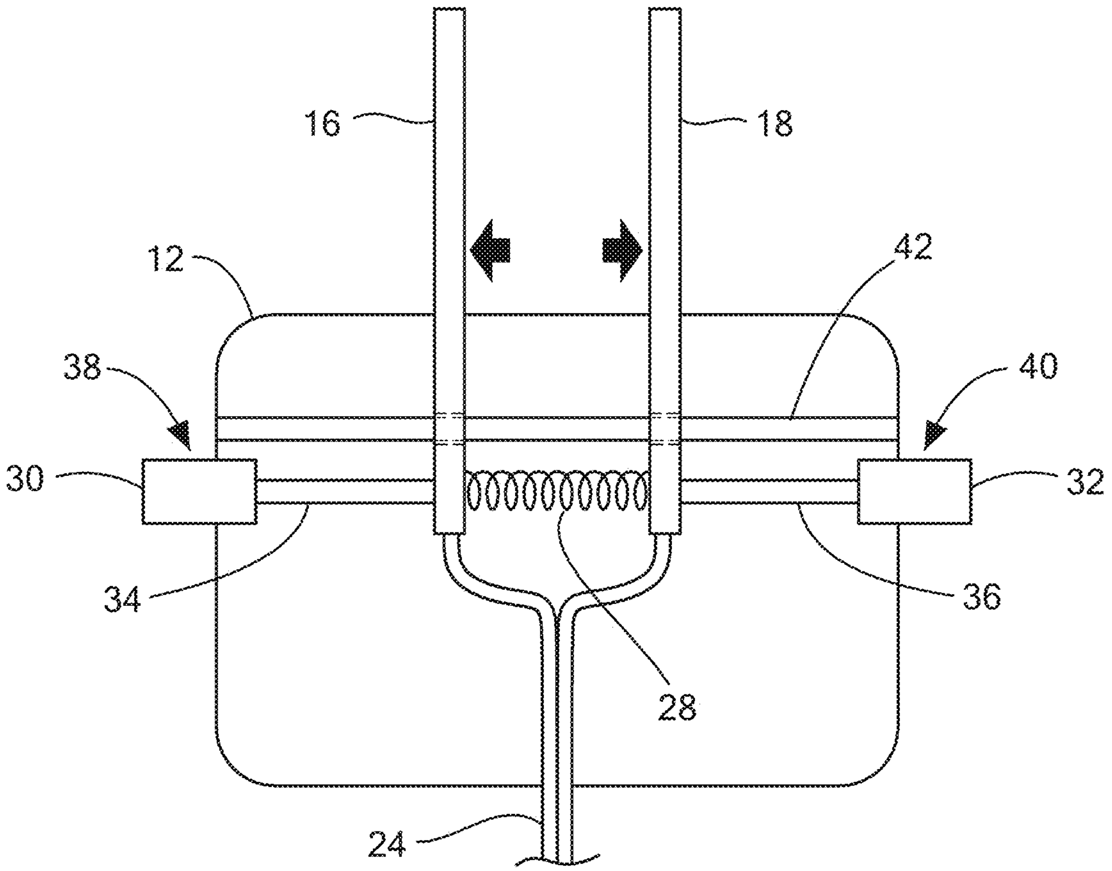
FIG. 2 illustrates details of the interior of the plug of FIG. 1.

As shown in FIG. 2, a biasing element 28 is located within the plug block or body 12 to impart lateral pressure to one or both of the first prong 16 and second prong 18. For example, the first prong 16 can be biased away from the second prong 18 or the prongs can be biased in opposite directions at the same time. As shown, the biasing element 28 includes a spring and the spring is disposed between the first prong 16 and the second prong 18. Although the biasing element 28 is shown as a spring that could be made of metal or plastic, the biasing element 28 could be made of a solid or coiled elastomer. The biasing element is shown toward the lowest portion of the prongs, but could be located within the body 12 further towards the free ends of the prongs 16, 18.

A locking mechanism can be provided to move or inhibit movement of the first prong and the second prong even if they are subject to biasing force. As shown, the locking mechanism includes first and second locking buttons, 30 and 32 respectively that include pins 34 and 36 respectively that contact or are joined to the outer sides of the first prong 16 and second prong 18, respectively. The plug body 12 includes engagement elements 38 and 40 that can selectively engage with the buttons 30 and 32, respectively to lock the buttons in place laterally with respect to the plug block or body 12 to prevent outward lateral movement of the first prong 16 and the second prong 18 beyond a selected distance. The biasing element (spring) 28 urges the prongs outward.

A track, rod or alignment element 42 can be disposed within the plug block or body 12 perpendicular to the longitudinal axis 14, wherein the first prong 16 and the second prong 18 define an aperture (not shown) through which the alignment element 42 is disposed, wherein the first prong and the second prong translate laterally along the alignment element while maintaining a parallel orientation with respect to each other.

Figure 3:
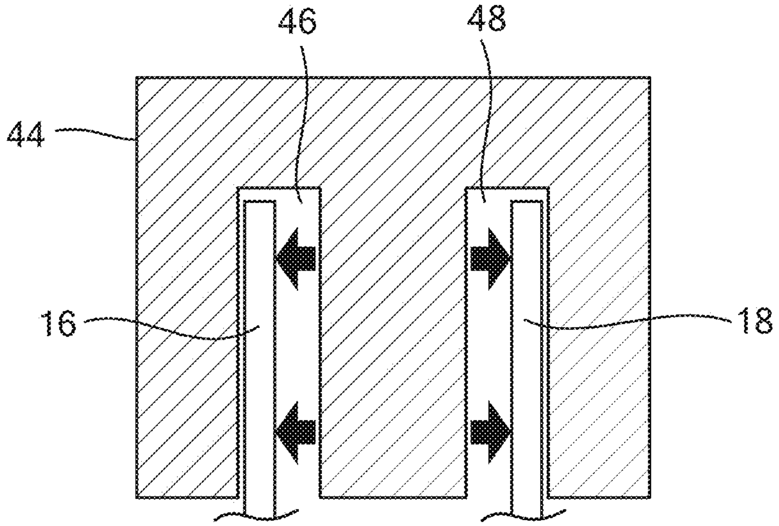
FIG. 3 shows prongs of the plug of FIG. 1 disposed within an electrical outlet.

FIG. 3 depicts a plug outlet/wall socket 44 having blade/prong receptacles 46 and 48. The width of the receptacles 46, 48 is exaggerated in this view for purposes of description of the plug 10 and its function. As shown, the prongs 16, 18 when placed in the receptacles 46, 48 might be loose or not make good contact with electrically conducting surfaces or contact points. However, because the biasing element 28 is urging one or both of the prongs 16, 18 outwards, the prongs are placed into firm, consistent physical and electrical contact with the conducting surfaces or points. Thus, consistent electrical connection is assured and the pressure and resulting contact friction inhibits casual, easy, or unintentional withdrawal of the prong 16, 18 from the receptacles 46, 48 of the socket 44. As the biasing element 28 applies outward pressure, the locking mechanism is passive, and there can be no need for engagement elements 38 and 40 to hold the buttons and pins in place. When it is desired to remove the plug 10 from the outlet 44, one or both buttons 30, 32 are pressed inward to reduce or overcome the biasing force and the contact force/friction between the prongs 16 and 18 is reduced so that the plug can easily be withdrawn from the outlet.

The biasing element can also cause one or both prongs to angle toward or away from the longitudinal axis rather than being displaced along a track or alignment element 42.

Figure 4:
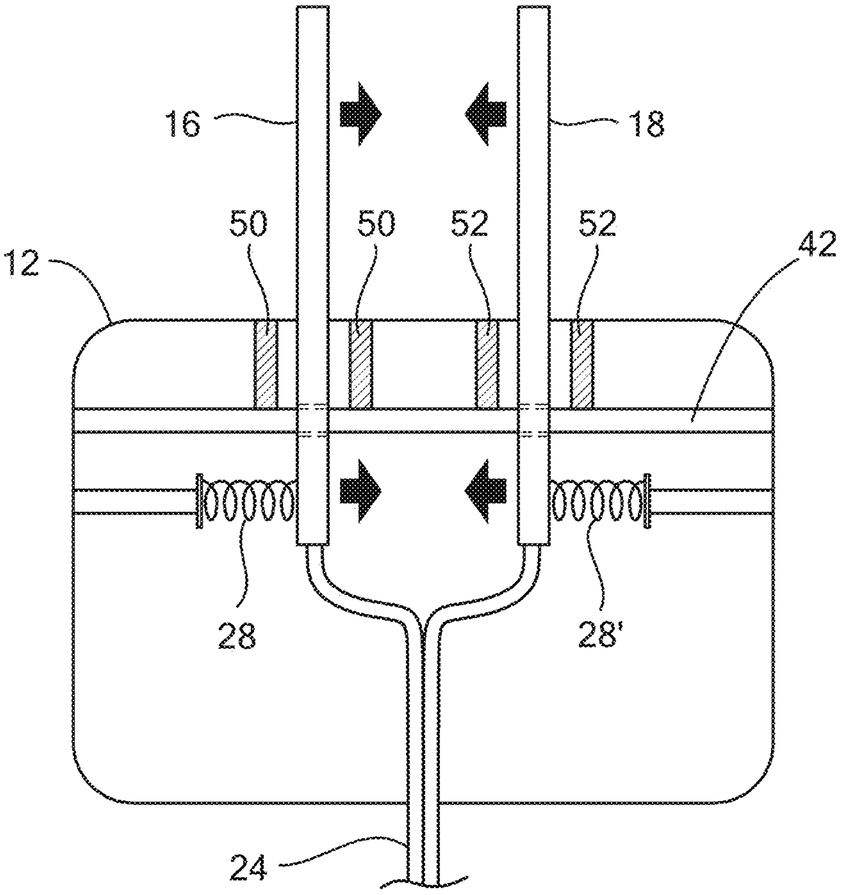
FIG. 4 illustrates additional details of the interior of the plug of FIG. 1.
Figure 5:
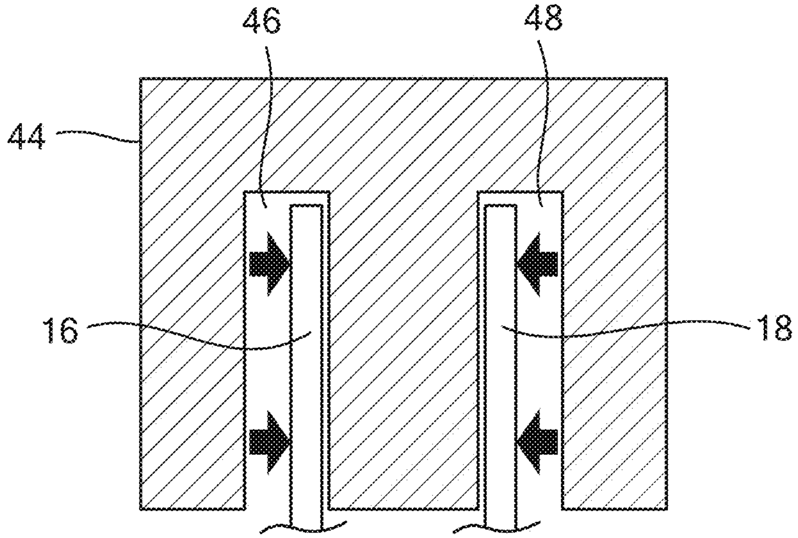
FIG. 5 shows prongs of the plug of FIG. 1 disposed within an electrical outlet.

FIG. 4 illustrates an alternate configuration where one or more prongs 16, 18 are biased inward 44 by providing a biasing element 28, 28' on the outer sides of the prongs. As the prongs are urged inward, as shown in FIG. 5, consistent electrical connection is assured and the pressure and resulting contact friction inhibits casual, easy, or unintentional withdrawal of the prong 16, 18 from the receptacles 46, 48 of the socket 44. Blocking elements 50 and 52 can be provided to limit inward and outward lateral movement of the prongs 16, 18 so that their spacing is not too wide or too narrow to be introduced into an outlet 44. As noted above, the movement of one or both prongs can be limited to under 2 mm. A blocking element can also be defined by walls of the plug body 12 that define the exit point of the prongs from the plug body.

Although the above described structures will benefit any plug, the features are especially beneficial for plug blocks weighing more than 2 ounces. The heavier the plug, the more significant the advantages and possibility of secure retention within the power socket.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques).

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A plug, comprising:
a body having a longitudinal axis;
a first prong extending outward from the body parallel to the longitudinal axis; and
a biasing element formed of a shaped wire within the body applying lateral pressure to the first prong to move the first prong laterally in parallel to the longitudinal axis.

2. The plug of claim 1, further comprising a second prong extending outward from the body parallel to the first prong.

3. The plug of claim 2, wherein the biasing element applies lateral pressure to the second prong to move the second prong laterally in parallel to the longitudinal axis.

4. The plug of claim 2, wherein the first prong is biased toward the second prong.

5. The plug of claim 2, wherein the first prong is biased away from the second prong.

6. The plug of claim 2, wherein the first prong and the second prong are biased in opposite directions.

7. The plug of claim 6, wherein the biasing element includes a spring.

8. The plug of claim 7, wherein the spring is disposed between the first prong and the second prong.

9. The plug of claim 8, further comprising a locking mechanism to inhibit movement of the first prong and the second prong.

10. The plug of claim 9, wherein the locking mechanism includes a first element that is laterally movable to displace one of the first prong and the second prong.

11. The plug of claim 10, wherein the first element is laterally movable to displace the first prong and further including a second element that is laterally movable to displace the second prong.

12. The plug of claim 11, wherein inward lateral movement of the first element and the second element counter the biasing force of the spring.

13. The plug of claim 10, wherein a portion of the first element extends laterally outside the body.

14. The plug of claim 12, wherein the body includes a blocking element to limit lateral movement of one of the first and second prong.

15. A plug, comprising:

a body having a longitudinal axis;

a first prong extending outward from the body parallel to the longitudinal axis;

a biasing element within the body applying lateral pressure to the first prong;

a second prong extending outward from the body parallel to the first prong; and an alignment element disposed within the body perpendicular to the longitudinal axis, wherein the first prong and the second prong define an aperture through which the alignment element is disposed, wherein the first prong and the second prong translate laterally along the alignment element while maintaining a parallel orientation with respect to each other.

16. A plug, comprising:

a body having a longitudinal axis;

a first prong extending outward from the body parallel to the longitudinal axis;

a second prong extending outward from the body parallel to the first prong;

a spring within the body disposed between the first prong and the second prong applying lateral pressure to the first prong and the second prong;

a locking mechanism to move the first prong and the second prong laterally counter to the lateral pressure provided by the spring; and an alignment element disposed within the body perpendicular to the longitudinal axis, wherein the first prong and the second prong define an aperture through which the alignment element is disposed, wherein the first prong and the second prong translate laterally along the alignment element while maintaining a parallel orientation with respect to each other.

17. The plug of claim 16, wherein a portion of the locking mechanism element extends laterally outside the body.

18. The plug of claim 16, wherein the body includes a blocking element to limit lateral movement of one of the first and second prong to less than 2 mm.

* * * * *